(12) United States Patent
Kikuchi

(10) Patent No.: US 8,705,067 B2
(45) Date of Patent: Apr. 22, 2014

(54) PRINTER SERVER, PRINT CONTROL METHOD, AND STORAGE MEDIUM FOR PRODUCING A PRINTED OUTPUT BY A DEVICE OF A LOW-DISPLAY AND LOW-INPUT CAPABILITY

(75) Inventor: Koji Kikuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 411 days.

(21) Appl. No.: 13/037,646

(22) Filed: Mar. 1, 2011

(65) Prior Publication Data

US 2011/0216347 A1  Sep. 8, 2011

(30) Foreign Application Priority Data

Mar. 3, 2010 (JP) ................................ 2010-046771

(51) Int. Cl.
 *G06K 15/00* (2006.01)
(52) U.S. Cl.
 USPC ............... 358/1.14; 709/206; 718/100; 726/6
(58) Field of Classification Search
 None
 See application file for complete search history.

(56) References Cited

U.S. PATENT DOCUMENTS

| 6,711,677 B1* | 3/2004 | Wiegley ........................ 713/151 |
| 2003/0151621 A1* | 8/2003 | McEvilly et al. ............. 345/744 |
| 2006/0173570 A1* | 8/2006 | Stimpson ...................... 700/123 |
| 2008/0076573 A1* | 3/2008 | Loehrer ......................... 463/42 |
| 2009/0147306 A1* | 6/2009 | Sugiyama .................... 358/1.15 |

FOREIGN PATENT DOCUMENTS

| JP | 2003-280843 A | 10/2003 |
| JP | 2007-115102 A | 5/2007 |

* cited by examiner

*Primary Examiner* — David S Cammack
(74) *Attorney, Agent, or Firm* — Canon USA, Inc., IP Division

(57) ABSTRACT

A print server configured to acquire temporary identification information used for uniquely identifying device identification and user identification from temporary identification information stored in a storage area according to a print instruction including device identification information used for identifying a device and user identification information used for identifying a user, and searches for and acquires a print job including the temporary identification information out of spooled print jobs, and provides the acquired print job including the temporary identification information to the device.

4 Claims, 11 Drawing Sheets

| LOGIN USER INFORMATION | LOGIN START TIME | NUMBER OF SIMULTANEOUS LOGINS |
|---|---|---|
| Yamada | 2009/12/01 13:00:15 | 1 |
| Tanaka | 2009/12/01 14:14:42 | 2 |
| Suzuki | 2009/12/01 15:26:12 | 1 |

802 —

| CONNECTED DEVICE IDENTIFIER | CONNECTION START TIME | LOGIN USER INFORMATION |
|---|---|---|
| 123456789ABC | 2009/12/01 12:00:15 | Yamada |
| 123456789DEF | 2009/12/01 14:14:42 | Tanaka |
| 123456789GHI | 2009/12/01 15:26:12 | Suzuki |

803 —

| TEMPORARY ID | CONNECTED DEVICE IDENTIFIER | LOGIN USER INFORMATION |
|---|---|---|
| 1111111 | 123456789ABC | Yamada |
| 2222222 | 123456789DEF | Tanaka |
| 3333333 | 123456789GHI | Suzuki |

FIG. 11

| PRINT JOB ID | JOB OWNER | COMMENT |
|---|---|---|
| 00000001 | Yamada | 1111111 |
| 00000002 | Yamada | |
| 00000003 | Yamada | 22222222 |
| 00000004 | Suzuki | 11111111 |
| 00000005 | Suzuki | |
| 00000006 | Yamada | 1111111 |

PRINTER SERVER, PRINT CONTROL METHOD, AND STORAGE MEDIUM FOR PRODUCING A PRINTED OUTPUT BY A DEVICE OF A LOW-DISPLAY AND LOW-INPUT CAPABILITY

BACKGROUND OF THE INVENTION

1. Field of the Invention

The present invention relates to a print server, a print control method, and a storage medium.

2. Description of the Related Art

In recent years, along with the development of techniques used for webifying application software and print servers, application software, and print servers are provided on the Internet. When a user uses such application software and print servers, the user takes processing described below.

First, based on a request given by a client personal computer (PC), a web print server stores a print job in a spool state. The print job is issued not only by the user himself. For example, in place of the user, a different user can designate another user being a user that performs printing and issue a print job.

Then, in using a multifunction device (including a printer device having only the print function) at an arbitrary location (e.g., business trip destination) by using, for example, an ID card to be authenticated, the user can acquire a print job associated with the user from the web print server and give a print instruction of the print job.

In order to realize this operation via the Internet, the user issues a print job to the server before making a business trip and the server spools the print job. When the user operates a multifunction device at a location where the printed output is needed, the print job is transmitted from the server to the multifunction device and printed. Since the printed output is obtained at the site where it is needed, security can be enhanced. Further, the user does not need to carry the printed output to the location where the output is needed.

Since the spool function of the web print server also serves as a temporary storage of print jobs, the number of print jobs that are spooled is assumed to be greater than the number of conventional print jobs.

Further, the print jobs are not printed according to the order they are spooled in the web print server and, for example, only a print job selected by the user using the operation panel of the multifunction device is printed.

As a conventional technique used for selecting and printing the print job described above, Japanese Patent Application Laid-Open No. 2007-115102 discusses a technique used for performing user authentication and displaying a list of print jobs given by the authenticated user. The authenticated user selects a print job and performs printing.

Further, as a different conventional technique, Japanese Patent Application Laid-Open No. 2003-280843 discusses a filtering technique. According to this technique, a search condition and a sort condition of a print job are set in advance for each user. When the user authentication is performed and a print job that corresponds to the search condition of the authenticated user is selected, the selected print job is printed.

According to the conventional technique discussed in Japanese Patent Application Laid-Open No. 2007-115102, the multifunction device needs to include a display/input unit by which information of a plurality of print jobs acquired from the web print server can be displayed and selected. However, regarding a multifunction device that includes only a display/input unit of a low display/input capability, it is difficult to display a list of print jobs. Accordingly, it is difficult for the user to select a job.

According to the technique discussed in Japanese Patent Application Laid-Open No. 2003-280843, since printing is performed according to the print condition and the sort order set in advance, the problem discussed in Japanese Patent Application Laid-Open No. 2007-115102 can be solved. However, the print condition needs to beset in advance if only the print job necessary at that time is to be printed.

For example, if user A visits an office on business and a certain printed output is urgently needed due to unexpected circumstances, it is natural that the user A asks user B, who can also issue a print job, to issue a print job whose user information is set to the user A by the server. However, if a different job that corresponds to the setting set in advance is spooled, according to the technique discussed in Japanese Patent Application Laid-Open No. 2003-280843, unnecessary printing may be performed.

SUMMARY OF THE INVENTION

The present invention is directed to a print server and a print control method useful for producing an urgently-needed printed output by a device of a low-display and low-input capability via the print server.

According to an aspect of the present invention, a print server communicating with a device includes a generation unit configured to generate, according to an issuance instruction of temporary identification information given by a user logged into the device, the temporary identification information at a time of login and a transmission unit configured to transmit to the device, if the user issues a print request of a print job to which the temporary identification information is set without logging out from the device, the print job to which the temporary identification information generated at the time of login is set from spooled print jobs, and if the user logs in again after logging out from the device and instructs issuance of temporary identification information, the generation unit generates new temporary identification information different from the temporary identification information which has been previously generated.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates an example of information storage related to a temporary ID in the web print server.

FIG. 11 illustrates an example of print job management of the web print server.

DESCRIPTION OF THE EMBODIMENTS

Various exemplary embodiments, features, and aspects of the invention will be described in detail below with reference to the drawings.

<System Configuration>

Figure 1:
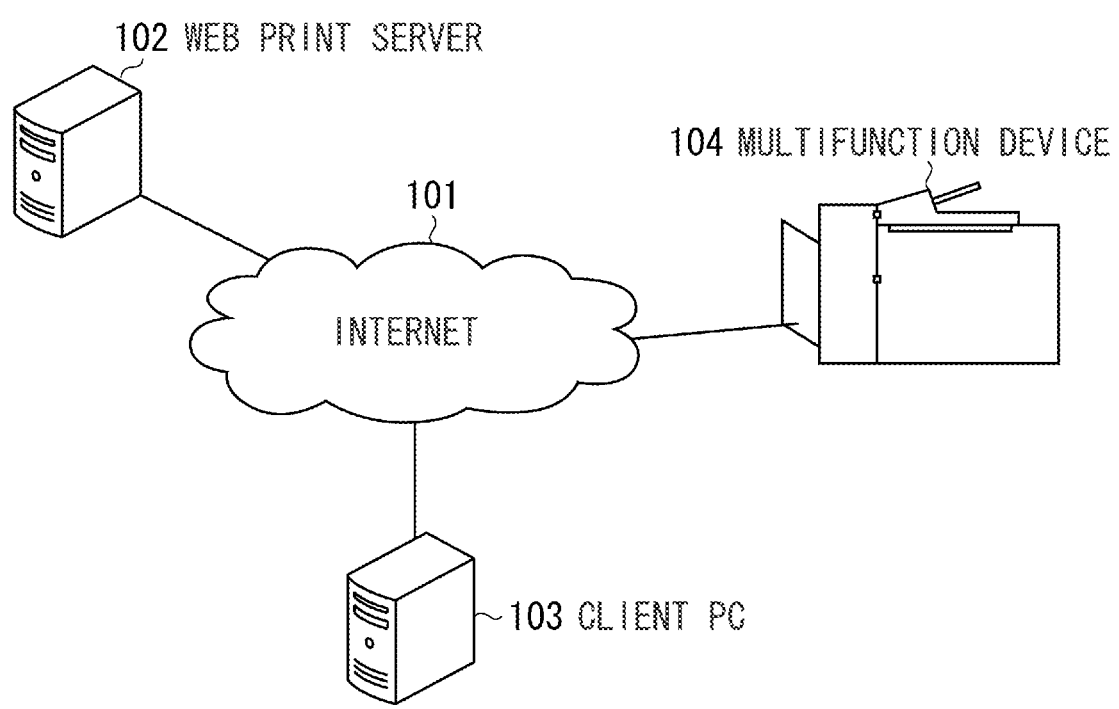
FIG. 1 illustrates an example of a system configuration of an exemplary embodiment of the present invention.

FIG. 1 illustrates an example of a system configuration.

In FIG. 1, a web print server 102, a client PC 103, and a multifunction device 104 are connected to the Internet 101 via a LAN and a firewall. The web print server 102 accepts a print job sent from the client PC 103 and spools the print job by using a spooler that manages print jobs. Further, the web print server 102 performs print processing of the print job in the spooler queue in response to a print request sent from the multifunction device 104.

The document of the print job spooled by the web print server may be a page description language (PDL) document or a document in a form before it is converted into a PDL document. The form of the document is not limited so long as the print job transmitted according to the print request given by the multifunction device 104 is printable by the multifunction device 104.

The web print server 102 issues, for example, a device identifier of the multifunction device 104 and a temporary ID associated with login user information of the multifunction device 104, and manages them in association with one another. Further, on receiving a print request from the multifunction device 104, the web print server 102 prints only the print job including the corresponding temporary ID.

The client PC 103 includes a web browser and issues a print job to the web print server 102. The print job is generated based on an arbitrary application. Further, the client PC 103 displays a web user interface (UI) provided by the web print server 102 by using the web browser, and also issues a print job. A temporary ID which has been input via the UI is set in the print job.

The multifunction device 104 includes a web browser. By using the web browser, the multifunction device 104 can display information sent from the web print server 102 and instruct execution of the printing function via the web. The multifunction device 104 logs into the web print server 102 by using information obtained from an IC card reader or login information. The multifunction device 104 can use various functions of the web print server 102 by logging into the web print server 102.

<Hardware Configuration of Web Print Server>

Figure 2:
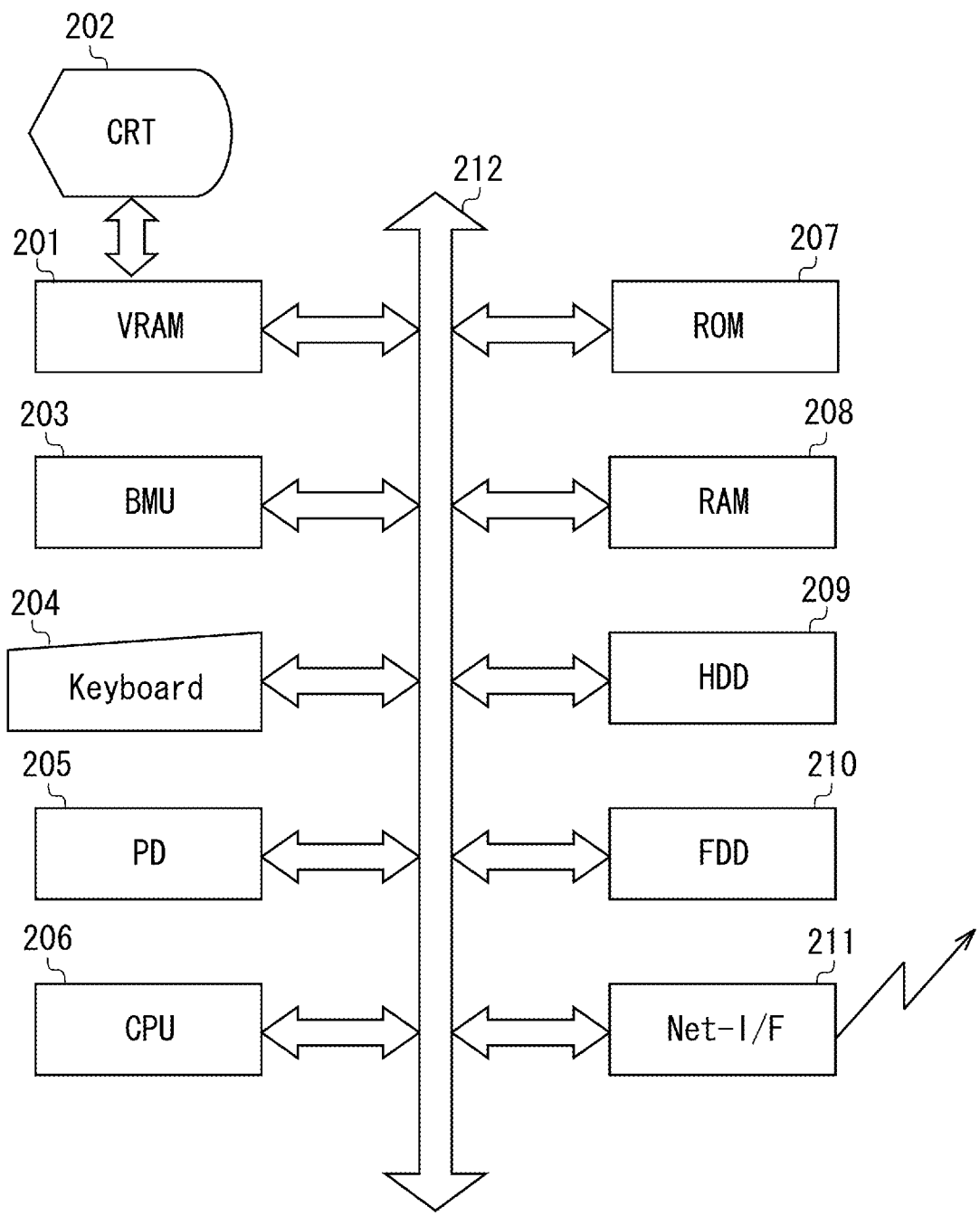
FIG. 2 is a block diagram illustrating an example of a hardware configuration of a web print server.

FIG. 2 illustrates an example of a hardware configuration of the web print server.

In FIG. 2, a video random access memory (VRAM) 201 rasterizes and stores characters or images to be displayed on a screen of a CRT display apparatus (CRT) 202. The CRT 202 is a device used for displaying display information acquired from the VRAM 201 on a screen. For example, a web server setting of the web print server 102 is displayed on the CRT 202. A bit move unit (BMU) 203 controls data transfer between memories or between a memory and a device.

A keyboard 204 is an input device having various keys used for inputting information. A pointing device (PD) 205 is used for pointing an icon on the screen, clicking buttons, and dragging.

A central processing unit (CPU) 206 controls each unit of the web print server 102 based on a control program stored in a read-only memory (ROM) 207. A program according to the present exemplary embodiment and an error handling program are also stored in the ROM 207. A random access memory (RAM) 208 is used as a work area when the CPU 206 executes each of the above-described programs. A hard disk drive (HDD) 209 and a flexible disk drive (FDD) 210 are used for storing application programs, data, database, and library described below.

A network interface (NET-I/F) 211 is used for controlling and diagnosing data so that data can be transferred between each apparatus on the network. An I/O bus 212, which includes an address bus, a data bus, and a control bus, connects each of the above-described units.

According to the above-described configuration, when the web print server 102 is turned on, the CPU 206 initializes the web print server according to a boot program in the ROM 207, loads an operating system (OS) from the HDD 209, and then operates various applications (various programs).

The web print server 102 of the present exemplary embodiment is a general-purpose information processing apparatus (computer, etc.) as its basis. Thus, the program is stored in the hard disk. However, the program can be stored in a ROM as well. The present exemplary embodiment is not limited by the storage medium.

Since the hardware configuration of the client PC 103 is similar to that of the web print server 102, their descriptions are not repeated. The function of the client PC 103 is realized by the CPU of the client PC 103 executing the processing based on a program stored in a HDD of the client PC 103.

<The Multifunction Device>

Figure 3:
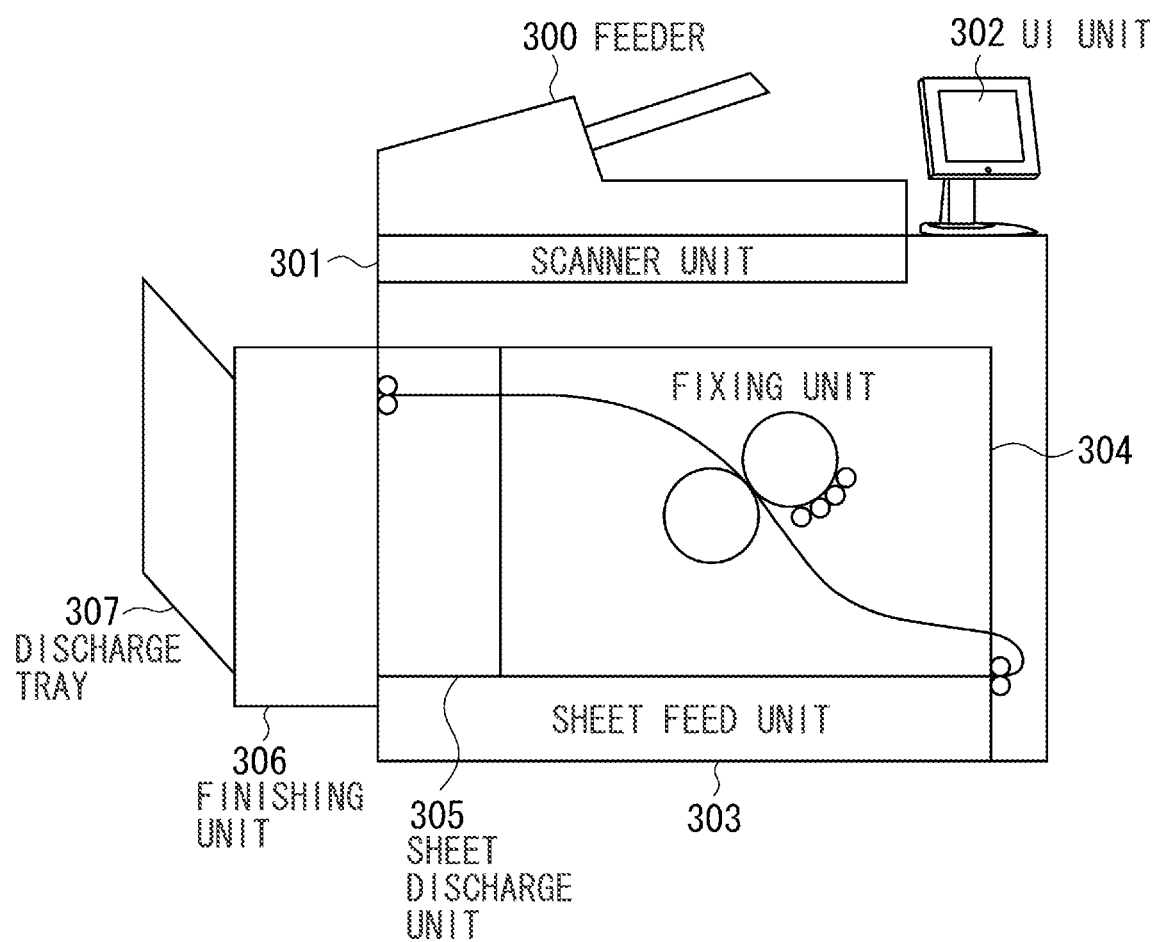
FIG. 3 illustrates an example of a configuration of a multifunction device.

FIG. 3 illustrates an example of a configuration of the multifunction device. Although a multifunction device is described as an example of the device according to the present exemplary embodiment, a printer may also be used as the device.

A feeder 300 (document automatic feeding unit) automatically feeds paper when a scanner unit 301 performs scanning. The scanner unit 301 scans the paper and digitizes the obtained information.

A UI unit 302 displays a browser used for printing a print job of the web print server 102 and exchanging an identifier of the multifunction device and accepts input operation. The technique of the present exemplary embodiment is especially effective when the capability of the UI unit 302 of the multifunction device is low (e.g., text input screen can display only a single line of text).

A sheet feed unit 303 feeds print paper to a fixing unit 304 when printing is performed. The fixing unit 304 fixes toner on the print paper fed from the sheet feed unit 303 when the paper is printed.

A sheet discharge unit 305 is a mechanism that discharges the print paper printed at the fixing unit 304. A finishing apparatus 306 performs processing such as stapling and punching of the paper discharged from the sheet discharge unit 305 according to an instruction given by the user. A discharge tray 307 is where the printed output, which is printed and finished, is discharged.

<Hardware Configuration of Multifunction Device>

Figure 4A:
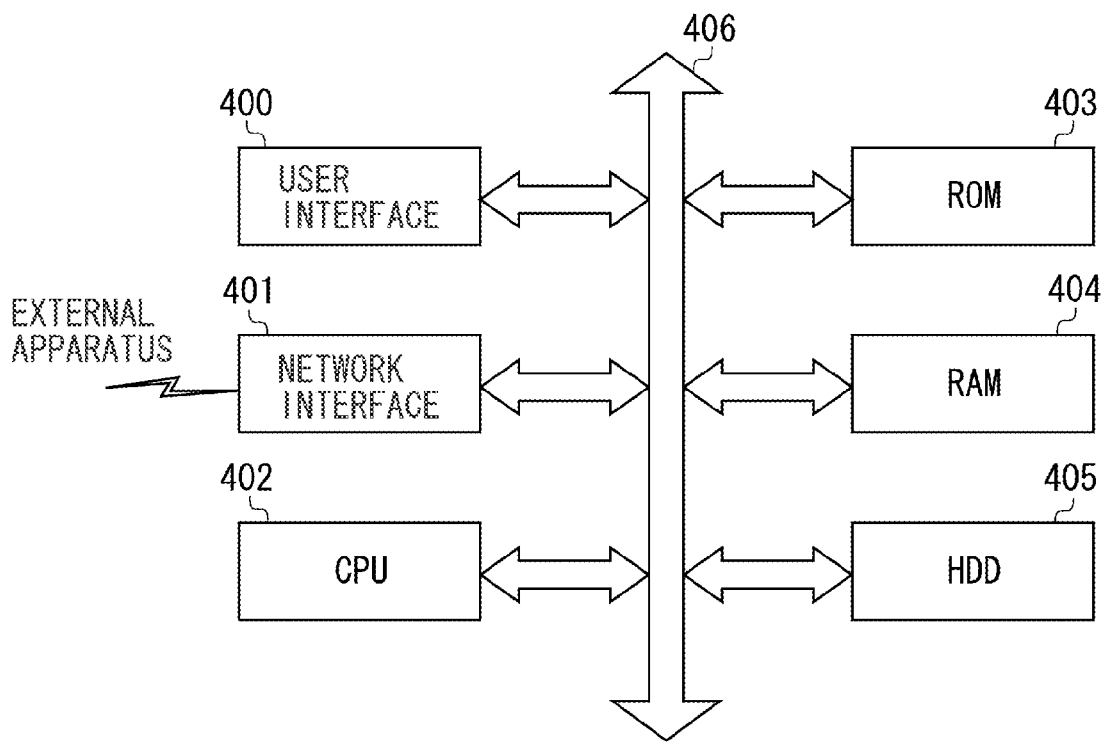
FIGS. 4A and 4B illustrate examples of hardware configurations of the multifunction device.
Figure 4B:
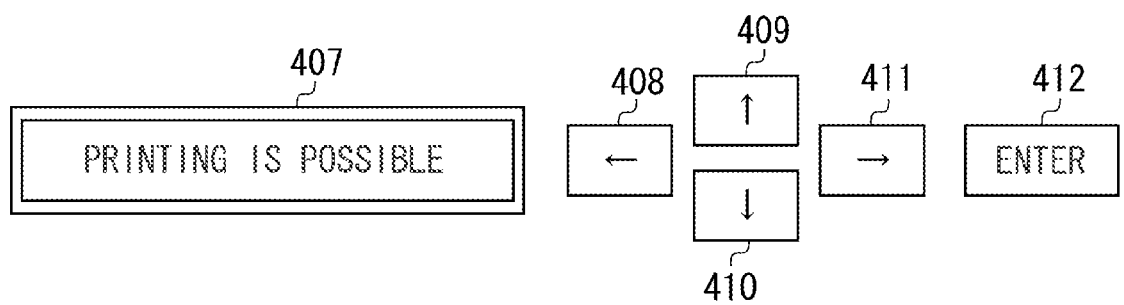

FIG. 4A illustrates an example of a hardware configuration of the multifunction device 104. FIG. 4B illustrates an example of a user interface 400. First, FIG. 4A will be described.

The user interface 400 corresponds to the UI unit 302 illustrated in FIG. 3. The user interface 400 serves as a display unit and an input unit for the operator. As a display unit, the user interface 400 displays a web browser. Further, as an input unit, minimal functions are realized by direction keys and an enter key of the user interface 400. However, the user interface 400 does not include a numeric input function such as a numeric keypad.

In other words, since the display performance of the user interface 400 is low, a plurality of print jobs cannot be displayed at a time. Further, since numeric keypads are not provided, the user cannot select a job via the user interface.

A network interface 401 communicates with an external device via a network. The network interface 401 is also used in the communication with the web print server 102.

A CPU 402 executes a program that controls the whole multifunction device. A browser 502 and a multifunction device identifier management unit 507 are realized by the CPU 402 executing a program. A ROM 403 records an integrated program and data. A RAM 404 is a temporary memory area. When the CPU 402 executes a program, the program is loaded into the RAM 404.

A HDD 405 is a large capacity memory and is used for storing the data transmitted from an external apparatus to the multifunction device. The execution program of the browser 502 and the program of the identifier management unit of the multifunction device are stored in the HDD 405. An input/output interface 406 connects each control unit.

FIG. 4A illustrates a portion of the multifunction device 104. In addition to the portion illustrated in FIG. 4A, the multifunction device 104 includes the scanner unit 301, etc. illustrated in FIG. 3. The CPU 402 also controls such units.

Next, FIG. 4B will be described. A display panel 407 is an example of a single line display panel. Direction keys 408 to 411 are hardware keys used for selecting the content displayed on the screen. Further, an enter key 412 is a hardware key used for determining the content selected by the direction keys 408 to 411 and displayed on the display panel 407.

<Software Configuration>

Figure 5:
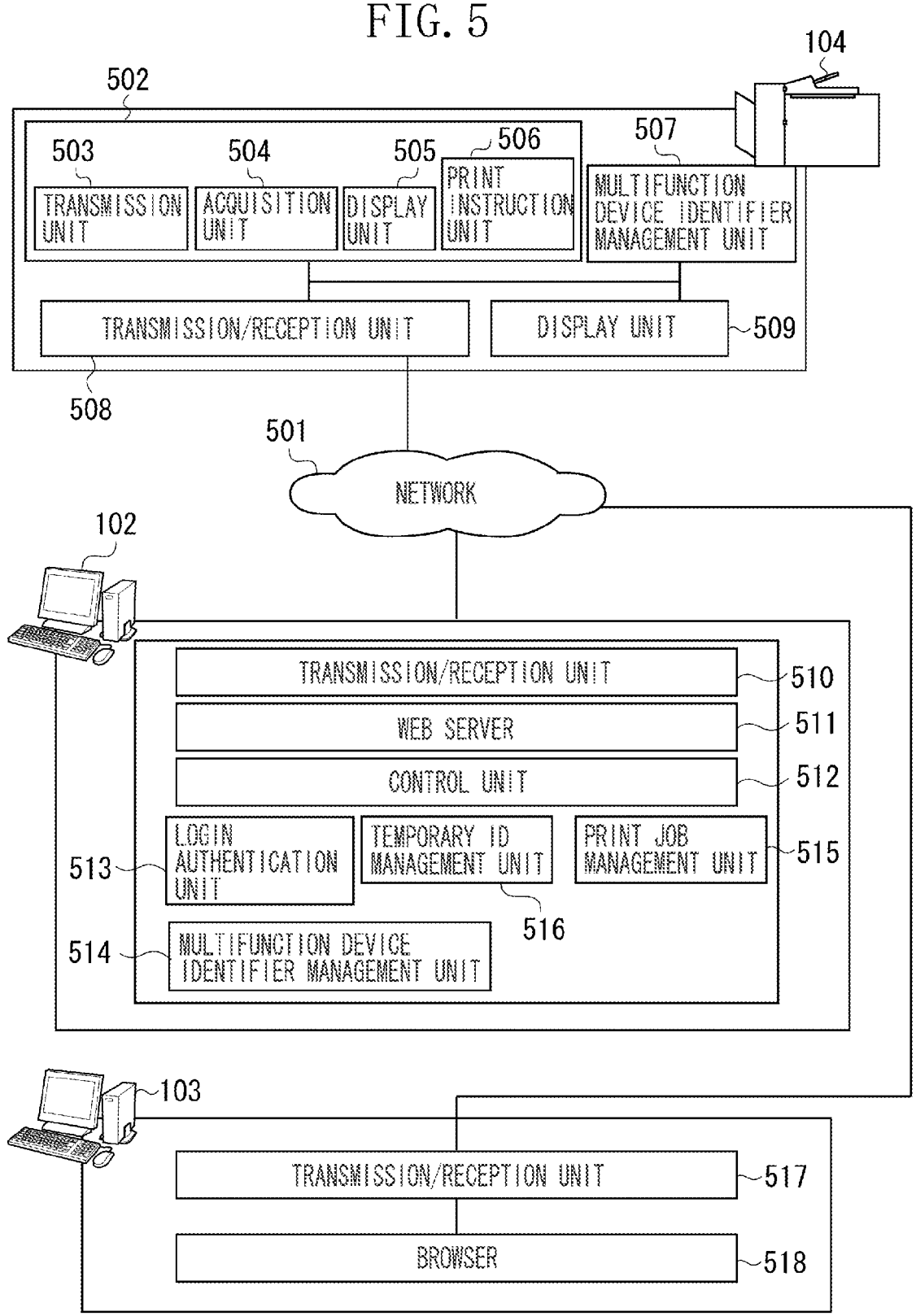
FIG. 5 illustrates an example of a software configuration of each apparatus included in the system.

FIG. 5 illustrates an example of a software configuration of each apparatus included in the system.

First, in FIG. 5, a network 501 is realized according to the Internet 101 illustrated in FIG. 1.

Next, each unit of the multifunction device 104 will be described. Processing of each unit of the multifunction device 104 is realized by the CPU 402 of the multifunction device 104 executing a program stored in the ROM 403 or the HDD 405 as needed by using the RAM 404.

The browser 502 is an application realized by the user interface 400 and operates on the multifunction device 104. The browser 502 displays a result of information exchanged between the multifunction device 104 and the web print server 102. According to the present exemplary embodiment, the browser 502 can display only a single line of text.

A transmission unit 503 is a processing unit in the browser 502. The transmission unit 503 transmits display content and a print request to the web print server 102 via a transmission/reception unit 508, and also transmits an identifier of the multifunction device after acquiring it from the multifunction device identifier management unit 507.

An acquisition unit 504 is a processing unit in the browser 502 and is used for acquiring a response to the request transmitted by the transmission unit 503. A display unit 505 is a processing unit of the browser 502. The response acquired (received) by the acquisition unit 504 is displayed on the browser 502.

A print instruction unit 506 is a processing unit in the browser 502. The print instruction unit 506 acquires an instruction from the user interface 400 (e.g., selection of the determination key), and transmits a print request from the multifunction device 104 to the web print server 102.

The multifunction device identifier management unit 507 manages information (identifier of the multifunction device) used for uniquely identifying each device. The multifunction device identifier management unit 507 provides the identifier of the multifunction device if a request for the identifier is given from the web print server 102 via the browser 502.

The transmission/reception unit 508 uses the network interface 401 to perform communication with an apparatus on the network. A printing unit receives an instruction from the print instruction unit 506 and operates each hardware unit for printing of the multifunction device 104 illustrated in FIG. 3.

Next, the web print server 102 will be described. Processing of each unit of the web print server 102 is realized by the CPU of the web print server 102 executing a program stored in the ROM or the HDD of the web print server 102 as needed by using the RAM of the web print server 102.

A transmission/reception unit 510 transmits/receives information exchanged between the transmission/reception unit 508 of the multifunction device 104 or a transmission/reception unit 517 of the client PC 103 and the web print server 102 via the network I/F 211.

A web server 511 is a web server application used for communication with the browser 502 via the web. The web server 511 receives request information from the transmission/reception unit 508 of the multifunction device 104 and transmits the received request information to a control unit 512. Further, the web server 511 transmits response information sent from the control unit 512 to the transmission/reception unit 508.

The control unit 512 exchanges information with the web print server 102 and controls the entire web print server 102 so that a necessary processing unit is invoked. A login authentication unit 513 receives login request information of a login request sent from the multifunction device 104 or the client PC 103 from the control unit 512, performs the authentication processing, and generates web content used for displaying the result of the authentication.

Static HyperText Markup Language (HTML) data can be used as data of the web content. Java (registered trademark) Server Pages (JSP) data, which is dynamic screen display data, can also be used.

A multifunction device identifier management unit 514 acquires and manages a multifunction device identifier of the multifunction device which is currently being connected. The multifunction device identifier management unit 514 can manage identifiers of a plurality of devices. The multifunction device identifier management unit 514 is an example of an identification information storage unit.

A print job management unit 515 manages (spools) print jobs issued by the client PC 103, and provides the multifunction device 104 with a print job that corresponds to the print request given by the multifunction device 104.

The configuration of the print job management unit 515 is not limited to the above-described configuration so long as a target print job can be identified. For example, the print job management unit 515 may be configured so that a corresponding print job identified by the print job management unit 515 can be acquired from the multifunction device 104 or a corresponding print job is transmitted from the web print server 102 to the multifunction device 104.

A temporary ID management unit 516 issues an ID (temporary ID), which is unique to the multifunction device by the login unit, and transmits the ID to the multifunction device 104 as well as manages it. The temporary ID is an example of temporary identification information. The temporary ID management unit 516 is an example of a temporary identification information storage unit.

If a user "A" logs in the web print server 102 from the multifunction device 104, a temporary ID is assigned to the user "A" by the web print server 102. If the user "A" logs out and logs in again later, a different ID will be assigned to the user "A".

Thus, the temporary ID management unit 516 manages the temporary ID in association with the multifunction device identifier and the login user information. Further, the print job management unit 515 includes a function that allows search of the temporary ID from the print jobs which are spooled (temporarily stored). By using this function, the print job management unit 515 provides the print job corresponding to the temporary ID to the multifunction device 104. The web print server 102 includes a printer driver used for generating PDL.

Next, the configurations of the client PC 103 will be described. Processing of each unit in the client PC 103 is realized by the CPU of the client PC 103 executing a program stored in the ROM or the HDD of the client PC 103 as needed by using the RAM of the client PC 103.

The client PC 103 communicates with the web print server 102 via the network 501, and instructs the web print server 102 to issue (generate) a print job. The transmission/reception unit 517 transmits/receives information exchanged between the web print server 102 of the transmission/reception unit 510 and the client PC 103 by using the network I/F 211. Further, the client PC 103 can execute an arbitrary web application, and can give a print instruction to the web print server 102.

<Example of Print Instruction Screen of Client PC 103>

Next, an example of a screen displayed by the client PC 103 when the client PC 103 issues a print job to the web print server 102 will be described with reference to FIG. 6.

Figure 6:
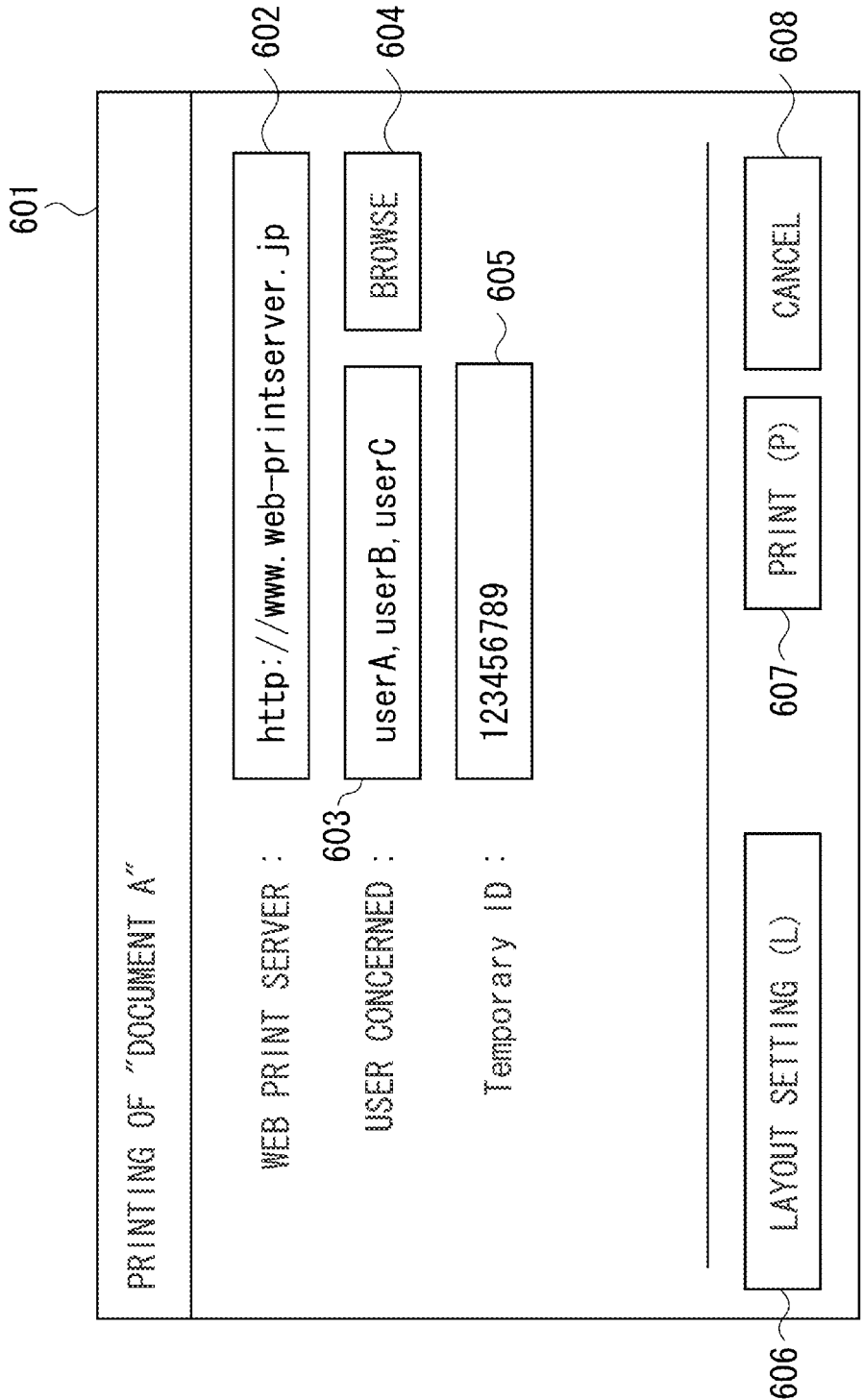
FIG. 6 illustrates an example of a print instruction screen of a client PC.

In FIG. 6, a print instruction screen 601 is displayed when a document edited by the application currently being operated is printed.

A text box 602 is where a print URL of a web print server to be used is input. A text box 603 is where a user that issues the print job is input. A button 604 is used for calling a screen for selecting the user designated in the text box 603. The description of the screen will be omitted since any type of screen can be used so long as a user can be selected from the list of users.

A text box 605 is where a temporary ID is input. For example, the user of the client PC 103 inputs the value displayed by the multifunction device 104 in process 708 in FIG. 7 described below in the text box 605 after receiving the value from the user of the multifunction device 104. In the example in FIG. 6, the temporary ID is "123456789".

A button 606 is used when the user displays a screen used for setting the layout of the print job. A button 607 is used when a print job that reflects setting content is issued to the selected web print server. A button 608 is used when the user cancels the issuance of the print job. The web print server can be designated by using this screen, and a job including a target user and a job identifier can be issued.

As a storage region of a temporary ID of a print job, a "comment" of the print job can be used. Thus, it is not necessary to change the format of the print job.

<Print Flow of Multifunction Device>

Figure 7:
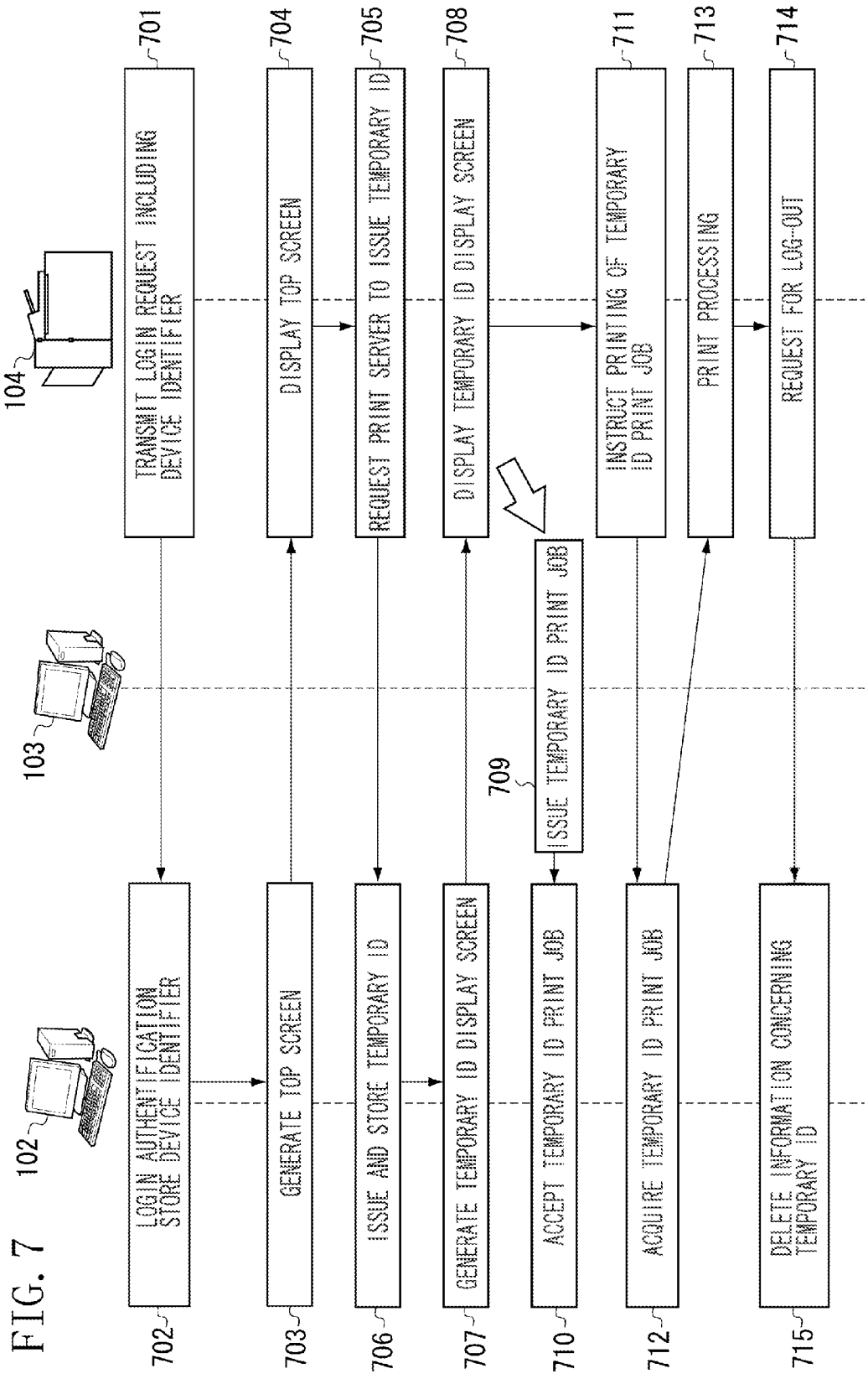
FIG. 7 illustrates an example of processing flow of each apparatus included in the system.

FIG. 7 illustrates an example of processes performed by each apparatus in the system.

In process 701, the multifunction device 104 transmits a login request including the user authentication information to the web print server 102. When the multifunction device 104 transmits the login request, the multifunction device 104 also transmits a device identifier. The device identifier is an example of device identification information used for identifying the multifunction device 104 managed by the multifunction device identifier management unit 507.

According to the present exemplary embodiment, the user authentication information is in the IC card. In other words, the multifunction device 104 generates the login request including user authentication information read from an IC card. However, the user authentication information can be input in the multifunction device 104 by a different method. For example, a user ID and/or a password can be entered via the screen.

Subsequently, in process 702, the login authentication unit 513 of the web print server 102 performs the login authentication processing based on the user authentication information included in the login request. Since the login authentication is performed according to a conventional technique, the description of the authentication is omitted.

If the login authentication is successful as a result of the authentication processing, the login authentication unit 513 stores the login user (login user information) as an example of the user identification information used for identifying the user who has passed the authentication in a record area of the web print server 102 such as the HDD or the like. A table 801 in FIG. 8 described below includes the login user information stored in the storage area.

Further, if the login is successful as a result of the authentication processing performed by the login authentication unit 513, the multifunction device identifier management unit 514 of the web print server 102 stores the device identifier included in the login request in a record area of the web print server 102 such as the HDD or the like. Then, the multifunction device identifier management unit 514 stores the device identifier in the storage area in association with the login user information used for identifying the user who has been authenticated (see table 802 in FIG. 8 described below)

In process 703, if the authentication performed by the login authentication unit 513 is successful, the web server 511 generates a screen 901 in FIG. 9 described below. The web print server 102 provides the screen 901 to the multifunction device 104. In process 704, the browser 502 of the multifunction device displays the web screen generated in process 703 as a top screen.

In process 705, the user of the multifunction device 104 displays a desired menu by operating direction keys 408 to 411 of the multifunction device 104, and instructs the web print server 102 to issue a temporary ID by selecting the enter key 412 (see screen 902 in FIG. 9 described below). The display screen of the multifunction device 104 can be a single line display.

The browser 502 can also display a next menu if the user operates the direction key. Thus, the browser 502 does not necessarily make an inquiry to the web print server 102 and the web screen is updated according to the direction key selected by the user as needed. On receiving a request for a temporary ID from the user, the browser 502 instructs the web print server 102 to issue a temporary ID.

In process 706, according to the request for a temporary ID in process 705, the temporary ID management unit 516 of the web print server 102 issues a temporary ID. The issued temporary ID is managed according to at least a combination of a device identifier and the login user information, and is a unique value with respect to the job in the web print server 102.

Naturally, the temporary ID is input via the user interface of the multifunction device 104. However, according to the present exemplary embodiment, the input capability of the multifunction device is low. Thus, the web print server 102 issues a temporary ID and the temporary ID is a value displayable on the screen of the multifunction device 104.

Further, the temporary ID is stored in the storage area of the web print server 102 together with, for example, the device identifier of the multifunction device 104 and the login user information (see table 803 in FIG. 8 described below).

In process 707, the web server 511 of the web print server 102 generates a web screen used for displaying the temporary ID, which has been issued and stored in process 706, by the multifunction device 104, and provides the web screen to the multifunction device 104.

In process 708, the browser 502 of the multifunction device 104 displays the web screen including the temporary ID generated in process 707 (see screen 903 in FIG. 9 described below). According to this display processing, the temporary ID is notified to the user operating the multifunction device 104.

The user that acquired the temporary ID lets another user who can issue a user-designated print job know of the temporary ID (transmits the temporary ID from the multifunction device 104 to the client PC 103 of the another user), and asks the another user to issue the necessary print job.

In process 709, a browser 518 of the client PC 103 displays the print instruction screen 601 in FIG. 6, and issues a temporary-ID-assigned print job according to the operation of the user via the screen.

In process 710, the print job management unit 515 accepts the print job issued by the client PC 103 in process 709. The print job management unit 515 spools the accepted print job.

Figure 9:
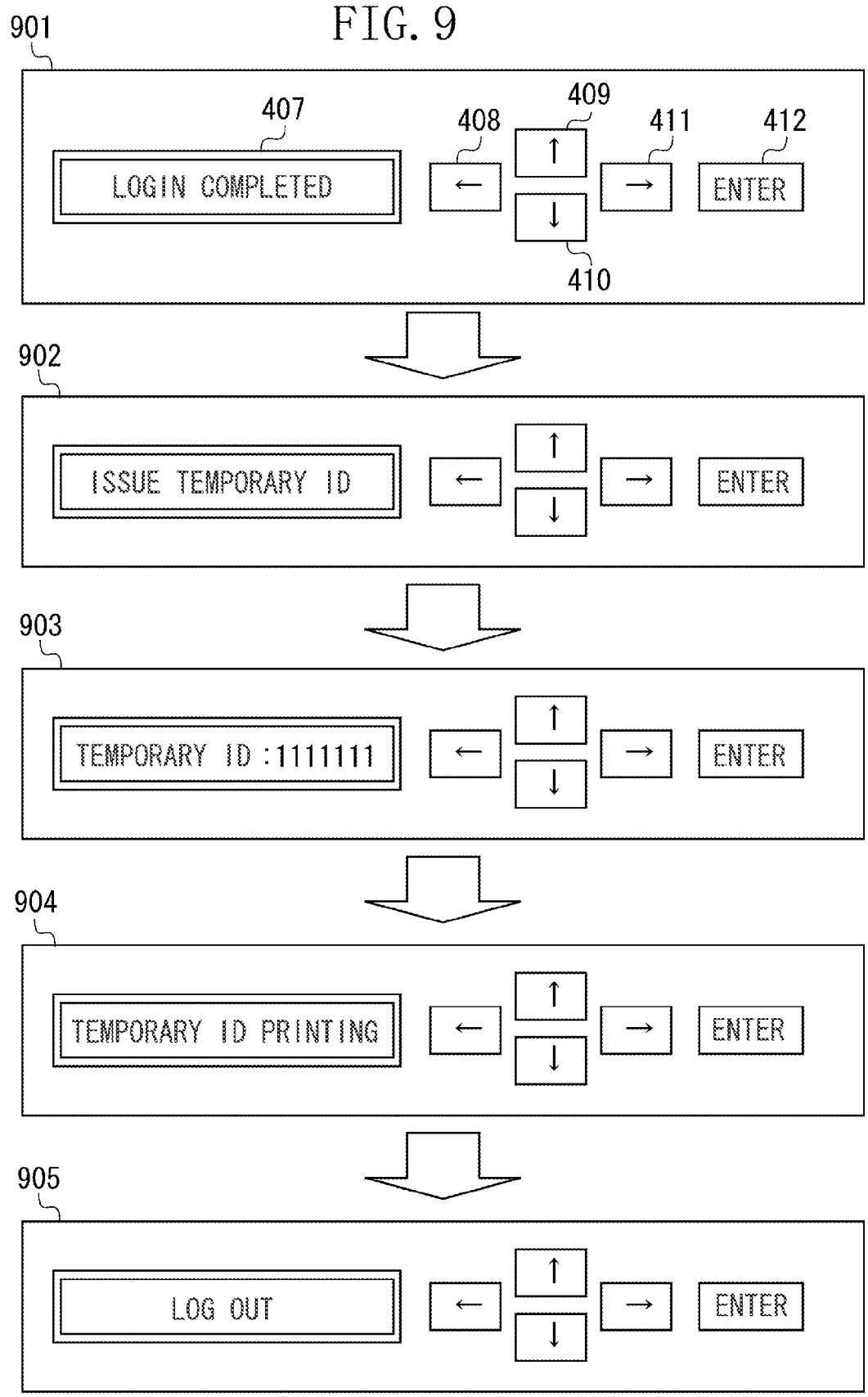
FIG. 9 illustrates an example of display screens and associated operations of the display multifunction device.

In process 711, according to an operation of the user via a screen 904 in FIG. 9, the browser 502 of the multifunction device 104 instructs the web print server 102 to print the temporary-ID-assigned print job.

As content of the instruction, the browser 502 sends to the web print server 102 at least a device identifier, user information of the user who is logged in (login user information), a print instruction of a print job (temporary ID job) in which the temporary ID managed by the web print server is set. In other words, the instruction transmitted in process 711 includes a print instruction indicating that the login user information, the device identifier, and the temporary ID job are to be printed.

In process 712, the print job management unit 515 of the web print server 102 acquires the device identifier and the login user information included in the print instruction. Then, the print job management unit 515 acquires the temporary ID, which is uniquely identified by the acquired device identifier and the login user information, and retrieves a print job including the acquired temporary ID out of the spooled print jobs.

Then, the print job management unit 515 provides the acquired print job to the multifunction device 104, and requests the multifunction device 104 to print the print job. Regarding the transmission of the print job, the web print server 102 may transmit the print job to the multifunction device 104 or the multifunction device 104 may acquire the print job from the web print server 102.

In process 713, the printing unit of the multifunction device 104 prints the print job provided from the web print server 102.

In process 714, the browser 502 of the multifunction device 104 displays a screen 905 in FIG. 9. When the determination key is pressed by the user, the browser 502 of the multifunction device 104 transmits a log-out request to the web print server 102.

In process 715, when the web print server 102 receives the log-out request from the multifunction device 104, the web print server 102 deletes the login user information and the device identifier stored in association with the login user information from the storage area. Further, the web print server 102 deletes the temporary ID uniquely identified according to the deleted login user information and the device identifier from the storage area.

According to the above-described processing, only the desired print job can be printed even if the display capability of the multifunction device is low.

<Information Management By Web Print Server>

Next, information management of the web print server 102 will be described with reference to FIG. 8.

The table 801 is used for managing the user currently logged into the web print server 102. Although the table 801 in FIG. 8 includes items such as "login user information", "login start time", and "number of simultaneous logins", the type of the item is not limited so long as the login user information can be managed by the table.

The "number of simultaneous logins" is an example of an item used for counting the number of client PCs currently logged into the web print server 102 on the assumption that a plurality of client PCs can log into the web print server 102 by using the same login user information.

The table 802 manages the device identifier which is simultaneously transmitted with the login user information from the multifunction device 104 in process 701. According to this table, the multifunction device, which is currently connected to the web print server 102, can be managed.

As described referring to the table 801, it is assumed that the login in the table 802 is performed based on the same login user information. Thus, the login user information is taken as an example of the items in the table 802. However, the present exemplary embodiment is not limited to the login user information.

The table 803 is a table used for managing the temporary IDs. Although "temporary ID", "connected device identifier", and "login user information" are taken as examples of the items in the table 803, the web print server 102 can manage other items in the table. Further, the web print server 102 does not necessarily store the temporary ID in association with a combination of a connected device identifier and login user information in a table or the like as illustrated in the table 803.

The storage form of the temporary ID of the web print server 102 is not limited so long as the temporary ID can be identified from the set of the connected device identifier and the login user information.

If the user logs-out and logs into the same multifunction device 104 later, the web print server 102 generates a temporary ID corresponding to the connected device identifier and the login user information. The generated temporary ID is different from the temporary ID which has been previously set.

To be more specific, in FIG. 8, a temporary ID "1111111" is generated for a combination of the connected device identifier "123456789ABC" and the login user information "Yamada". After logging out, "Yamada" logs in from the same multifunction device 104 again.

In this case, the web print server 102 generates, for example, a temporary ID "4444444" different from the temporary ID which has been previously set, for a combination of the connected device identifier "123456789ABC" and the login user information "Yamada".

<Example of Screen of Multifunction Device 104>

Next, an example of a screen of the multifunction device 104 will be described with reference to FIG. 9. The screen example employs the screen of the user interface 400 in FIG. 9. Since the login input in process 701 can be performed by authentication using an IC card or the like in the multifunction device 104, description of the processing of the login input will be omitted.

The screen 901 is an example of a top screen displayed in process 704. The display "login completed" indicates that the login authentication has been successful. The screen 902 is an example of the screen which is displayed when, for example, a direction key 410 on the top screen is selected and a menu item is selected from the screen 901. On the screen 902, a menu item "issue temporary ID" which is used for instructing the web print server 102 to issue a temporary ID is displayed.

If the enter key 412 is selected in this state, the screen changes to the screen 903. The screen 903 is an example of a screen used for displaying the temporary ID issued by the web print server 102. According to the example in FIG. 9, "1111111" is issued as the temporary ID. Further, for example, if a new print job is issued by the client PC 103, the temporary ID "1111111" is set to the print job.

The screen 904 is a screen displayed when, for example, the direction key 410 on the screen 903 is selected in a state a print job to which a temporary ID is set is issued by the client PC 103. If the user selects the enter key 412 while this screen is displayed, printing of the print job with the temporary ID managed by the web print server will be instructed.

A screen 905 is an example of a screen used for logging out. This screen is displayed by the user selecting the direction key 410 after the print processing is completed. If the user selects the enter key 412 while this screen is displayed, the log-out processing will be performed.

As described referring to the screens described above, a desired print job can be printed according to the operations performed by the multifunction device 104.

<Flowchart of Web Print Server>

Next, the processing of the web print server 102 will be described with reference to FIG. 10.

In step S1001, the web server 511 determines a type of the request transmitted from the client PC 103 or the multifunction device 104. The web server 511 determines the type of the request based on a command included in the request. More specifically, the web server 511 determines whether the request is "login", "issue job", "issue temporary ID", "print temporary ID job", or "log out". Then the web server 511 branches the processing according to the type of the request.

In step S1002, the login authentication unit 513 performs authentication so as to determine whether the user is a user who can use the service based on the user authentication information (user identifier or password) transmitted from the client PC 103 or the multifunction device 104.

In step S1003, the login authentication unit 513 determines whether the authentication has been successful. If the authentication has been successful (YES in step S1003), the processing proceeds to step S1004. If the authentication has failed (NO in step S1003), the processing proceeds to step S1006. If the determination in step S1003 is "NO" before the processing proceeds to step S1006, then the web server 511 generates a response screen in step S1006 indicating that the user authentication has failed.

In step S1004, the web server 511 determines whether a request has been transmitted from the client PC 103 or from the multifunction device 104. If the web server 511 has received a request from the multifunction device 104 (YES in S1004), the processing proceeds to step S1005.

On the other hand, if the web server 511 has received a request from the client PC 103 (NO in S1004), the processing proceeds to step S1006. If the determination in step S1004 is "No" before the processing proceeds to step S1006, the web server 511 generates a response screen in step S1006 indicating that the authentication has been successful to the client PC 103.

In step S1005, the multifunction device identifier management unit 514 stores the device identifier included in the request in the storage area. As a result, the table 801 in FIG. 8 is generated. If the processing proceeds to step S1006 from step S1005, in step S1006, the web server 511 generates a response screen such as the screen 901 illustrated in FIG. 9 indicating that the authentication has been successful for the multifunction device 104.

The processing in step S1006 is performed so that a response screen including various processing results is displayed on the screen of the source of the request. Since the content of the screen depends on the processing, it is described in detail for each processing type.

In step S1007, the web server 511 transmits the screen generated in step S1006 to the client PC 103 or the multifunction device 104, which is the source of the request. Then, the processing in FIG. 10 ends.

On the other hand, in step S1008, the print job management unit 515 temporarily stores the print job transmitted from the client PC 103 and manages it. The management of the print job is described below with reference to FIG. 11. If processing proceeds from step S1008 to S1006, in step S1006, the web server 511 generates a response screen indicating that the print job has been accepted.

In step S1009, the temporary ID management unit 516 generates a temporary ID which is at least uniquely identified by a combination of the device identifier and the login user information. If the temporary ID is a unique identifier that satisfies such a condition and is a value that can be displayed by the multifunction device 104, it is not limited to a value such as the one illustrated in FIG. 8.

In step S1010, the temporary ID management unit 516 manages the temporary ID generated in step S1009 by using the table 803 in FIG. 8. If the processing proceeds to step S1006 from step S1010, in step S1006, the web server 511 generates a web screen including a temporary ID such as the screen 903 in FIG. 9.

If only the print job to which the generated temporary ID is set in step S1009 is to be printed, the user does not log out from the multifunction device, and issues a request for printing of the temporary ID job.

In step S1011, the print job management unit 515 acquires the device identifier information and the login user information included in the print request of the temporary ID job.

In step S1012, based on the device identifier and the login user information acquired in step S1011, the print job management unit 515 detects the temporary ID which is uniquely identified from the table stored in the storage unit or the like, and acquires the detected temporary ID. According to this processing, the temporary ID used for printing the temporary ID is determined.

In step S1013, by using the temporary ID determined in step S1012, the print job management unit 515 searches for the print jobs to which the temporary ID is assigned out of the print jobs of the user concerned and draws up a list. The listed print jobs are the print jobs that will be printed according to the print instruction.

In step S1014, the print job management unit 515 performs print control so that all the print jobs listed in step S1013 are printed. If printing is possible, the listed print jobs can be transmitted from the web print server 102 or the print jobs can be acquired from the multifunction device 104.

In step S1015, on receiving a log-out instruction, the login authentication unit 513 deletes the current login information in the table 801 illustrated in FIG. 8. The session information is also cleared according to this processing.

In step S1016, the multifunction device identifier management unit 514 deletes the device identifier in the table 802 in FIG. 8. If the request is sent from the client PC 103, this process is skipped as there is no device identifier to delete.

In step S1017, the temporary ID management unit 516 deletes the temporary ID in the table 803 in FIG. 8. As is in step S1016, if the request is given from the client PC 103, this process is skipped as there is no temporary ID to delete.

Next, an example of a print job managed by the print job management unit 515 of the web print server 102 will be described with reference to FIG. 11. Although the items in the table in FIG. 11 are "print job ID", "job owner", and "comment", the items are not limited to such items.

The "print job ID" is a value that can uniquely determine each print job when the print job is managed by the print job management unit 515. The "job owner" indicates the user who can print the job. The "comment" includes a temporary ID, which is input when the print job is issued by the client PC 103. The temporary ID is not necessarily included in the "comment". Any item can be used so long as it is useful in searching the temporary ID.

Figure 10:
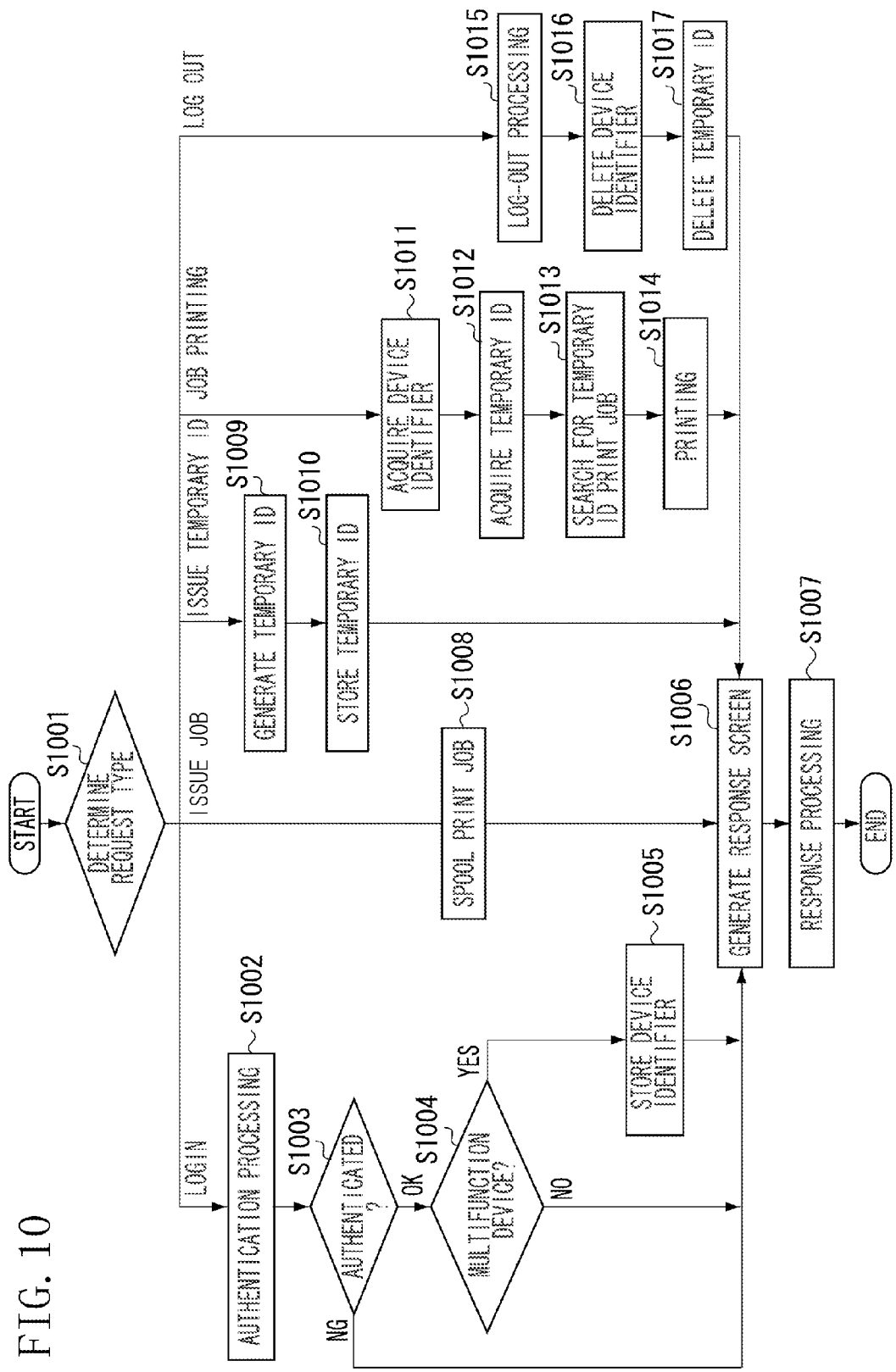
FIG. 10 is a flowchart illustrating an example of processing corresponding to a request given by the web print server.

For example, if a user (login user information is "Yamada") logged into the multifunction device 104 requests for issuance of a temporary ID, and is assigned a temporary ID "3333333", and further, a print job to which the temporary ID "3333333" is set is managed by the web print server 102, then if the above-described user logs out from the multifunction device in that state, the temporary ID "3333333" will be deleted according to step S1017 in FIG. 10.

When the above-described user logs in again and requests for issuance of a temporary ID, a temporary ID "1111111" different from the previously issued temporary ID will be issued. Then, by notifying this temporary ID "1111111" to the user of the client PC and requesting for issuance of a print job, a print job to which the temporary ID "1111111" is set is issued from the client PC, and managed by the web print server 102.

Next a case where the user having the above-described login user information "Yamada" instructs printing of a temporary ID job in that job storage state without logging out from the multifunction device 104, will be described. In this case, the jobs corresponding to the login user information "Yamada" and the temporary ID "1111111" assigned for the login user are print jobs of ID "00000001" and ID "00000006". Thus, these two print jobs will be printed.

Thus, even if the multifunction device 104 is operated by the same user, only the print job to which the temporary ID, which has been generated during the current login, is set will be printed. Thus, printing of unnecessary print jobs can be prevented.

According to the present exemplary embodiment, a printable print job can be urgently issued from the client PC 103 to the web print server 102 that stores a plurality of print jobs. Further, only the corresponding print jobs can be printed by the multifunction device 104.

According to the present invention, even if the display and input capability of a device is low, only a highly-urgent printed output can be issued/printed via a print server.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-046771 filed Mar. 3, 2010, which is hereby incorporated by reference herein in its entirety.

What is claimed is:

1. A print system comprising an information processing apparatus, a printing apparatus and a print server, comprising:
    a first transmitting unit, in the printing apparatus, configured to transmit a device identifier of the printing apparatus and user information of a user logging into the printing apparatus to the server to request a temporary ID;
    a storing unit, in the print server, configured to generate the temporary ID when the request is received, and to store the temporary ID in association with a combination of the device identifier and the user information;
    a second transmitting unit, in the print server, configured to transmit the temporary ID to the printing apparatus;
    a display unit, in the printing apparatus, configured to display the temporary ID;
    a third transmitting unit, in the information processing apparatus, configured to transmit print data with the temporary ID added to the print server, after the temporary ID displayed at the printing apparatus is entered by a user at the information processing apparatus;
    a print instruction unit, in the printing apparatus, configured to transmit to the print server the device identifier of the printing apparatus and the user information of the user logging in the printing apparatus, after the print data with the temporary ID is transmitted to the print server, to request printing of a job having the temporary ID added;
    an obtaining unit, in the print server, configured to obtain the temporary ID corresponding to the device identifier and the user information received from the print instruction unit;
    a fourth transmitting unit, in the print server, configured to transmit the print data to which the obtained temporary ID is added to the printing apparatus; and
    a printing unit, in the printing apparatus, configured to print the print data.

2. The print system according to claim 1, further comprising a deletion unit, in the print server, configured to delete the temporary ID, in a case where the user corresponding to the temporary ID has logged out from the printing apparatus.

3. A print method for use in a print system comprising an information processing apparatus, a printing apparatus and a print server, the print method comprising:
    transmitting, by a first transmitting unit in the printing apparatus, a device identifier of the printing apparatus and user information of a user logging into the printing apparatus to the server to request a temporary ID;
    generating, by a storing unit in the print server, the temporary ID when the request is received, and storing the temporary ID in association with a combination of the device identifier and the user information;

transmitting, by a second transmitting unit in the print server, the temporary ID to the printing apparatus;

displaying, by a display unit in the printing apparatus, the temporary ID;

transmitting, by a third transmitting unit in the information processing apparatus, print data with the temporary ID added to the print server, after the temporary ID is displayed at the printing apparatus is entered by a user at the information processing apparatus;

transmitting, by a print instruction unit in the printing apparatus, to the print server the device identifier of the printing apparatus and the user information of the user logging in the printing apparatus, after the print data with the temporary ID is transmitted to the print server, to request printing of a job having the temporary ID added;

obtaining, by an obtaining unit in the print server, the temporary ID corresponding to the device identifier and the user information received from the print instruction unit;

transmitting, by a fourth transmitting unit in the print server, the print data to which the obtained temporary ID is added to the printing apparatus; and printing, by a printing unit in the printing apparatus, the print data.

4. The print method according to claim 3, further comprising deleting, by a deletion unit in the print server, the temporary ID, in a case where the user corresponding to the temporary ID has logged out from the printing apparatus.

\* \* \* \* \*